United States Patent [19]

Muller et al.

[11] Patent Number: 5,091,214

[45] Date of Patent: Feb. 25, 1992

[54] PROCESS FOR THE PRODUCTION OF A LAYER OF SELF-CICATRIZING POLYURETHANE, AND PRODUCTS OBTAINED

[75] Inventors: René Muller, Yerres; Gérard Daudé, Villenave D'Ornon, both of France

[73] Assignee: Saint-Gobain Vitrage International, Aubervilliers Cedex, France

[21] Appl. No.: 533,332

[22] Filed: Jun. 5, 1990

[30] Foreign Application Priority Data

Jun. 5, 1989 [FR] France .................. 89 07375

[51] Int. Cl.⁵ .............................. B05D 5/06
[52] U.S. Cl. ................... 437/164; 427/165; 427/389.7; 427/393.5; 428/38; 428/423.1; 428/425.6
[58] Field of Search ............ 521/170, 172, 174, 902; 528/76, 80; 427/164, 165, 340, 341, 389.7, 393.5; 428/38, 423.1, 425.6

[56] References Cited

U.S. PATENT DOCUMENTS

| | | | |
|---|---|---|---|
| 4,265,798 | 5/1981 | Mishra | 427/341 X |
| 4,467,014 | 8/1984 | Smith | 521/902 X |
| 4,657,796 | 4/1987 | Musil et al. | 427/164 X |

Primary Examiner—Michael Lusignan
Attorney, Agent, or Firm—Oblon, Spivak, McClelland, Maier & Neustadt

[57] ABSTRACT

A coating layer of a thermohardening polyurethane having self-cicatrization properties is prepared by preparing a reactive mixture of an isocyanate component which is a diisocyanate or a mixture of diisocyanate monomers capable of forming an isocyanate trimer, a polyol monomer having a functionality of at least 2 and a trimerization catalyst; placing the reactive mixture onto a support for formation of said layer; heating the reactive mixture to a temperature sufficient to initiate trimerization; and then further heating the reactive mixture to initiate and conduct polymerization thereby forming said polyurethane layer.

16 Claims, No Drawings

PROCESS FOR THE PRODUCTION OF A LAYER OF SELF-CICATRIZING POLYURETHANE, AND PRODUCTS OBTAINED

BACKGROUND OF THE INVENTION

1. Field of the Invention

The present invention relates to the production of a layer of polyurethane of high optical quality, which can be used in the production of laminated safety windows, in particular for the production of a layer of thermohardening polyurethane having the properties of resistance to scratching and abrasion, which can be used as a cover layer of a solid or laminated rigid support made of glass and/or a rigid plastic material such as polycarbonate, methyl polymethacrylate, or as a cover layer for a more flexible layer, for example a layer of polyurethane with energy absorption properties, a layer of polyester, these layers themselves being in contact with the rigid support.

2. Description of the Background

A cover layer of the type described above is discussed, for example, in the publications of French Patents 2,187,719; 2,251,608 and 2,574,396 (U.S. Pat. No. 4,657,796). This said layer, which is also self-cicatrizing, is based on thermohardening polyurethane and has a high capacity for elastic deformation, a low modulus of elasticity, less than 2000 DaN/cm$^2$, and an elongation to rupture of more than 60% with less than 2% plastic deformation, under normal temperature conditions. A thermohardening polyurethane which is especially preferred is the one described in the publication of the French Patent 2,251,608.

In order to produce a layer of this type, a process with reactive flow is generally used, which is a process in which the layer of thermohardening polyurethane is formed starting with a homogeneous mixture of the reaction components, which are allowed to flow continuously on a support, generally a flat support made of glass, which is located below the flow apparatus. A process of reactive flow is described, for example, in French Patent 2,442,128. The components which form the reaction mixture for flow are, on the one hand, a polyol component which is generally a polyether polyol or a polyester polyol with a functionality greater than 2, generally 3 or between 2 and 3, and, on the other hand, an isocyanate component which can be chosen from among 1,6-hexane diisocyanate biurets or triisocyanurates, this component having a functionality of 3.

This process with reactive flow of the mixture of the two components described above results in a layer with excellent optical quality, which also presents the desired properties such as resistance to scratching, to abrasion, to outside agents, to solvents and the like. However, this reactive flow is not entirely satisfactory except at layer thicknesses generally above 200 µm. For lesser thicknesses, on the order of 100 µm and less, although the mechanical properties are generally suitable, the optical quality of the layer obtained is not always satisfactory.

To produce layers of thermohardening polyurethane with low thicknesses, particularly below 300 µm, a process of reactive pulverization has been proposed. In this case, the reaction mixture is no longer allowed to flow using a flow head, but rather pulverized, for example using a device with a bowl rotating at high speed, such as described, for example, in European Patent 0,161,184 (U.S. Pat. No. 4,749,586). But here again, the optical quality obtained is not always satisfactory for layers with a thickness on the order of 100 µm and less.

SUMMARY OF THE INVENTION

Accordingly, one object of the present invention is to provide a process for the production of a layer of polyurethane by reactive flow or reactive pulverization, which eliminates the disadvantages discussed above, and in particular allows the production of a layer of thermohardening self-cicatrizing polyurethane which has good optical quality, even for thicknesses less than 100 µm.

Briefly, this object and other objects of the present invention as hereinafter will become more readily apparent can be attained in a process for the preparation of a layer of thermohardening polyurethane by preparing a reactive mixture of an isocyanate component which is a diisocyanate or a mixture of diisocyanate monomers capable of forming an isocyanate trimer, a polyol monomer having a functionality of at least 2, and a trimerization catalyst, placing the reactive mixture onto a support for formation of said layer, heating the reactive mixture to a temperature sufficient to initiate trimerization, and then further heating the reactive mixture to initiate and conduct polymerization thereby forming said polyurethane layer.

DETAILED DESCRIPTION OF THE PREFERRED EMBODIMENTS

Trimerization of the isocyanate reactant in situ, in the invention, makes it possible, in surprising manner, to obtain a polyurethane layer having all the qualities required for use in safety windows. It is submitted that from a knowledge of the difficulties of producing a layer with high optical quality from a reaction mixture which is very homogeneous, consisting of components with adapted functionality, in other words, a functionality of 3 for the isocyanate component, in order to obtain the desired thermohardening polyurethane final product, it would not be possible for one of skill in the art to envisage providing a supplemental reaction, a source of heterogeneity of the layer, which could result in irreparable optical defects, within a process for production of a layer with high optical quality by reactive flow.

Trimerization of the isocyanate reactant in situ by the process of the invention can be cyclotrimerization with the resultant formation of a triisocyanurate as shown in the following schematic employing 1,6-hexamethylene diisocyanate monomer:

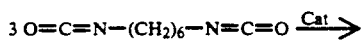

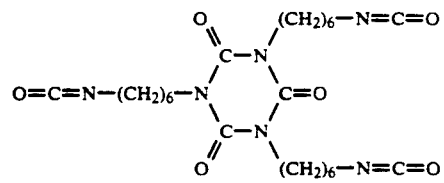

In addition to 1,6-hexamethylene diisocyanate shown above, other monomer diisocyanates can also be used in the present process. These are diisocyanates which are capable of forming isocyanate triisocyanurates or isocyanate biurets as indicated below, starting with a single type of monomer or a mixture of monomers. Suitable diisocyanates include 3-isocyanatomethyl-3,5,5-trimethyl cyclohexyl diisocyanate (IPDI), m-tetramethyl xylylene diisocyanate (m-TMXDI), and 2,2,4-trimethyl-6-hexane diisocyanate (TMDI).

In order to cyclotrimerize 1,6-hexamethylene diisocyanate in situ, known catalysts for the cyclotrimerization reaction in a reactor can be used such as, for example, organometallic catalysts, quaternary ammonium hydroxides and organic acid salts, strong bases such as potassium acetate and potassium octoate.

The quantities of catalysts employed can vary, depending on the type of catalyst. Generally, an amount of catalyst between 0.01 and 5% by weight relative to the weight of diisocyanate in the reaction mixture is chosen.

A catalyst that is particularly suitable for trimerization of 1,6-hexamethylene diisocyanate in situ is a quaternary ammonium salt, for example the product sold commercially under the name of Dabco TMR.

In an embodiment of the invention, trimerization in situ can be performed in a biuret forming reaction involving diisocyanate monomer, particularly 1,6-hexamethylene diisocyanate, in the presence of biuret promoting agent, such as a primary, secondary or tertiary aliphatic amine, which produces isocyanate biurets with low viscosity.

The polyol component used in the process of the invention can be any known one which is used for the production of layers of thermohardening polyurethane described in the publications of the patents already cited such as FR 2,187,719 (U.S. Pat. No. 4,232,080), 2,251,608 (U.S. Pat. No. 3,979,548) and 2,574,396.

The polyol component can be chosen from among polyether polyols, polyester polyols obtained by reaction of polyfunctional alcohols such as 1,2,3-propanetriol (glycerol), 2,2-bis(hydroxymethyl)-1-propanol (trimethylol ethane) 2,2-bis(hydroxymethyl)-1-butanol (trimethylol propane), 1,2,4-butanetriol, 1,2,6-hexanetriol, 2,2-bis(hydroxymethyl)-1,3-propanediol (pentaerythritol) and 1,2,3,4,5,6-hexanehexol (sorbitol) with aliphatic diacids such as malonic acid, succinic acid, glutaric acid, adipic acid, suberic acid and sebacic acid, or with cyclic ethers such as ethylene oxide, 1,2-propylene oxide and tetrahydrofuran oxide or even poly($\epsilon$-caprolactone) polyols. The molecular weight of the branched polyols is advantageously approximately 250 to 4000 and preferably approximately 450 to 2000.

The preferred polyol component is selected from among the polyether polyols having a molecular weight of approximately 450 obtained by condensation of 1,2-propylene oxide with 2,2-bis(hydroxymethyl)-1-butanol and having a content of free hydroxyl groups of approximately 10.5 to 12% by weight, a slightly branched polyester polyol based on trimethylol propane, 1,6-hexanediol, adipic acid and o- and i-phthalic acid, having a content of OH radicals of 3 to 5% by weight, a trifunctional lactone polyester polyol based on trimethylol propane or glycerol, and $\epsilon$-caprolactone having a content of OH groups of approximately 8 to 12% by weight.

Other than the catalyst for the trimerization reaction in situ, the reaction mixture advantageously contains a second catalyst, which specifically promotes the formation of polyurethane by the condensation of the triisocyanate formed in situ and the polyol component. The catalyst is an organometallic compound, for example, particularly an organic tin compound such as dibutyl-stannous dilaurate.

In order to assure trimerization of the diisocyanate prior to the reaction with the polyol, the quantity of the catalyst which is employed to specifically promote trimerization is greater than the quantity of the catalyst employed for the polyurethane formation reaction. Thus, the quantity of the trimerization catalyst employed can be advantageously more than 10 times greater than the quantity of the catalyst.

The quantities of diisocyanate, on the one hand, and polyol on the other hand, in the reaction mixture, are preferably calculated to have a final ratio of NCO/OH between 0.7 and 1.2.

Another advantage of the present process is that the trimerization reaction utilizes the temperature conditions employed in the production of a polyurethane layer by reactive flow of the reaction mixture of components with a functionality greater than 2. In other words, the reaction mixture is allowed to flow at a temperature which is generally below 80° C., on a support which itself is brought to a temperature below 80° C., the layer formed on the flow support then being increased to a temperature on the order of 100° to 150° C. for polymerization.

Because of the low viscosity of the reaction mixture which is allowed to flow or is pulverized according to the invention, it is possible to obtain layers of self-cicatrizing polyurethane by this process which have good optical qualities, with a thickness of only several tens of microns, but also up to thicknesses which can be as high as several hundred microns.

The support for formation of the layer on which trimerization is carried out simultaneously with or just before polymerization is advantageously a continuous support of glass, or a continuous metallic band, or even a flexible ribbon such as those described in the publications of the European Patents 0038760 and 0131483 (U.S. Pat. No. 4,605,528), mentioned above, if applicable, with a separation agent such as described in French Patent 2383000, for example.

Having generally described this invention, a further understanding can be obtained by reference to certain specific examples which are provided herein for purposes of illustration only and are not intended to be limiting unless otherwise specified.

EXAMPLE 1

On a mobile support of glass passing by in a continuous manner, covered with a separation agent which can be a material such as one described in French Patent 2383000, for example, i.e., a modified addition product of ethylene oxide, a homogeneous mixture of the following components is allowed to flow:

1000 g of a polyether with a molecular weight of approximately 450 obtained by condensation of 1,2-propylene oxide with 2,2-bis-(hydroxymethyl)-1-butanol having a content of free hydroxyl groups of approximately 10.5 to 12%, containing 0.5% by weight of a stabilizer, 0.75% by weight of a quaternary ammonium salt as a catalyst for the trimerization of the diisocyanate, 0.025% by weight of a catalyst for the polyurethane polymerization reaction, specifically dibutyl stannous dilaurate, and 0.05% by weight of a sheeting agent; and 880 g of 1,6-hexamethylene diisocyanate.

The theoretical final ratio of NCO/OH is 0.8.

To apply the mixture, a flow head such as described in French Patent 2347170 is used. A uniform layer with a thickness of 0.1 mm is formed on the flow support, which is at a temperature of about 40° C. when the flow is applied. The temperature of the layer is then raised to about 80° C. to achieve trimerization of the isocyanate component, for about 5 minutes, followed by another increase in temperature to 120° C. for about 15 minutes, for polymerization of the polyurethane layer. The thermal treatment lasts for a total of approximately 20 minutes. The layer obtained is transparent and presents good optical quality. This layer demonstrates the properties of resistance to scratching and to abrasion, as well as characteristics of mechanical strength such as resistance to scratching and elongation to rupture, as indicated below, comparable to the characteristics of a layer produced as described in French Patent 2251608, by flow of the mixture of trifunctional components, for example.

EXAMPLE 2

The procedure of Example 1 is followed in which the following homogeneous mixture is allowed to flow:

942 g of a trifunctional polycaprolactone based on trimethylolpropane and e-caprolactone having a content of free hydroxyl groups of approximately 9.3% by weight, containing 0.5% by weight of a stabilizer, 0.75% by weight of a quaternary ammonium salt as a catalyst for the trimerization, 0.025% by weight of a catalyst for the polymerization reaction, specifically dibutyl stannous dilaurate, and 0.05% by weight of a sheeting agent; and 1000 g of 1,6-hexamethylene diisocyanate.

The theoretical final ratio of NCO/OH is 1.

A layer with a thickness of 0.1 mm is formed. The layer is brought to a temperature of 120° C. for 20 minutes. The layer obtained presents good optical quality and mechanical properties, as indicated below, making it suitable for use as a coating layer for safety glass.

EXAMPLE 3

The procedure of Example 2 is repeated except that the layer formed is 0.3 mm thick.

After polymerization, the layer obtained exhibits good optical quality.

COMPARATIVE EXAMPLE

A reaction mixture is prepared by mixing 1000 g of a trifunctional polyisocyanate formed from isocyanurate based on 1,6-hexamethylene diisocyanate having a content of free NCO groups of 21.5% by weight, with 942 g of a trifunctional polycaprolactone having a content of free OH groups of 9.3% by weight. The ratio of NCO/OH is therefore 1. First, 0.015% by weight relative to the weight of the polycaprolactone, dibutylstannous dilaurate is added to the polycaprolactone as a catalyst.

The reaction mixture is deposited on the flow support as in Example 1, to form a layer with a thickness of 0.1 mm.

The temperature is raised to 120° C. for 15 minutes, to achieve polymerization of the polyurethane layer.

The layer obtained is of poorer optical quality than in the preceding examples.

Stripes are observed (which is not the case when the layer is thicker). The abrasion test is therefore not significant.

After polymerization of the coating layers prepared above, and after having removed the formation support, their mechanical properties are determined by measuring the traction resistance of the sheets, and the traction elongation according to the standard of DIN 53455. Furthermore, the abrasion resistance is determined according to the European standard ECE R-43, and the scratching resistance according to the Erichsen method, using layers of polyurethane adhering to sheets of glass. During the determination of scratching resistance according to Erichsen, an experimental set-up such as that described in the standard DIN 53799 is used, except that the conical scratching diamond used has a conic angle of 50 degrees and a radius of curvature of 15 μm at the tip of the cone. For an evaluation of the scratching resistance, the greatest application weight of the scratching diamond for which no permanent visible damage on the surface is identifiable is indicated.

The evaluation of the surface condition of the polyurethane layers is conducted by visual examination.

The results of mechanical measurements are summarized in Table 1 below. Table 1 also indicates the intervals in which the measured values must be located for the polyurethane layer to have self-cicatrizing properties and to be able to meet the utilization requirements for safety windows, for the various mechanical properties.

The coating layer obtained by the process of the invention can be used in safety windows, alone or in combination with a layer of polyurethane which has energy absorption properties, to form a sheet of two layers as described, for example, in European Patents 0,132,198 and 0,133,090 (U.S. Pat. Nos. 4,652,494 and 4,671,838).

TABLE 1

|  | rupture resistance N/mm² | traction elongation % | abrasion % | scratching resistance (g) |
| --- | --- | --- | --- | --- |
| Required interval limit values | 5–40 | >60 | <4 | >10 |
| Example 1 | 15.7 | 90 | 3.8 | 30 |
| Example 2 | 13.7 | 85 | 2.4 | 35 |
| Example 3 | 14.1 | 85 | 2.3 | 34 |
| Comparative Example | 24 | 115 |  | 24 |

Having now fully described the invention, it will be apparent to one of ordinary skill in the art that many changes and modifications can be made thereto without departing from the spirit or scope of the invention as set forth herein:

What is claimed as new and desired to be secured by Letters Patent of the United States is:

1. A process for preparing a coating layer of a thermohardening polyurethane having self-cicatrization properties, comprising:

preparing a mixture of effective reactive amounts of an isocyanate component which is a diisocyanate or a mixture of diisocyanate monomers capable of forming an isocyanate trimer, a polyol monomer having a functionality of at least 2 and a trimerization catalyst;

placing the reactive mixture onto a support for formation of said layer;

heating the reactive mixture to a temperature sufficient to initiate trimerization; and then further heating the reactive mixture to initiate and conduct polymerization thereby forming said polyurethane layer.

2. The process according to claim 1, wherein the trimerization is carried out simultaneously with or just before the polymerization of the monomer ingredients.

3. The process according to claim 1, wherein the isocyanate monomer is selected from the group consisting of 1,6-hexamethylene diisocyanate, 3-isocyanatomethyl-3,5,5-trimethylcyclohexyldiisocyanate, m-tetramethyl xylylene diisocyanate and 2,2,4-trimethyl-6-hexane diisocyanate.

4. The process according to claim 1, wherein the trimerization catalyst is a catalyst which produces a triisocyanurate.

5. The process according to claim 1, wherein the trimerization catalyst is a catalyst which produces an isocyanate biuret.

6. The process according to claim 1, wherein the isocyanate monomer is 1,6-hexamethylene diisocyanate.

7. The process according to claim 4, wherein the trimerization catalyst is selected from the group consisting of organometallic catalysts, quaternary ammonium organic acid salts, and strong bases.

8. The process according to claim 7, wherein the trimerization catalyst is a quaternary ammonium organic acid salt.

9. The process according to claim 1, wherein the polyol component is formed essentially of a polyol with a functionality greater than 2.

10. The process according to claim 1, wherein the reactive mixture further comprises a catalyst for polymerization of the monomers.

11. The process according to claim 10, wherein the concentration by weight of the trimerization catalyst in the reactive mixture is at least ten times that of the polymerization catalyst.

12. The process according to claim 1, wherein the polyol monomer is selected from the group consisting of a polyether obtained by condensation of 1,2-propylene oxide with 2,2-bis (hydroxymethyl)-1-butanol, a polyester polyol based on trimethylolpropane, hexanediol, adipic acid and o- and i-phthalic acid, a trifunctional lactone polyester polyol based on trimethylol propane or glycerol, and $\epsilon$-caprolactone.

13. The process according to claim 1, wherein the coating layer is combined with a layer of polyurethane having energy absorption properties, obtained by reactive flow.

14. A coating layer of a polyurethane obtained by the process according to claim 1.

15. A sheet of plastic material of high optical quality, formed from the coating layer according to claim 14.

16. A window glass comprising a support of glass or plastic material, solid or laminated, having a coated layer of claim 1 thereon.

* * * * *